(12) United States Patent
Richter

(10) Patent No.: US 7,934,375 B2
(45) Date of Patent: May 3, 2011

(54) VEHICLE EXHAUST SYSTEMS

(75) Inventor: Michael Richter, Richmond (AU)

(73) Assignee: Pacemaker Headers Pty Ltd, South Australia (AU)

( * ) Notice: Subject to any disclaimer, the term of this patent is extended or adjusted under 35 U.S.C. 154(b) by 924 days.

(21) Appl. No.: 11/825,851

(22) Filed: Jul. 9, 2007

(65) Prior Publication Data

US 2008/0006026 A1 Jan. 10, 2008

(30) Foreign Application Priority Data

Jul. 10, 2006 (AU) ................. 2006903680

(51) Int. Cl.
  *F01N 1/00* (2006.01)
(52) U.S. Cl. ............... 60/324; 60/282; 60/312; 60/313; 60/322; 181/227; 181/240; 181/241
(58) Field of Classification Search ............. 60/282, 60/312, 313, 322, 323, 324; 181/227, 228, 181/240, 241
See application file for complete search history.

(56) References Cited

U.S. PATENT DOCUMENTS

| 3,948,349 A * | 4/1976 | Bychinsky | 181/206 |
| 4,792,014 A * | 12/1988 | Shin-Seng | 181/280 |
| 4,884,399 A * | 12/1989 | Morris | 60/313 |
| 6,460,248 B2 * | 10/2002 | Butler | 29/890.08 |
| 6,662,900 B2 * | 12/2003 | Cathcart et al. | 181/240 |
| 2007/0095056 A1 | 5/2007 | Richter | |

FOREIGN PATENT DOCUMENTS

| GB | 2140503 A | * 11/1984 | 60/312 |
| GB | 2161215 A | * 1/1986 | 60/312 |

* cited by examiner

*Primary Examiner* — Binh Q Tran
(74) *Attorney, Agent, or Firm* — Osha • Liang LLP

(57) ABSTRACT

The present invention relates to a balance pipe assembly for a vehicle exhaust system including at least a pair of exhaust pipes or pipe shaped portions, and a further pipe or pipe shaped portion extending between the exhaust pipes or pipe shaped portions so as to act as a balance pipe. The assembly further includes at least one of the exhaust pipes or pipe shaped portions including means adapted to reduce the pressure of exhaust gasses passing there through at a position downstream of the balance pipe or pipe shaped portion.

5 Claims, 2 Drawing Sheets

VEHICLE EXHAUST SYSTEMS

TECHNICAL FIELD

The present invention relates to vehicle exhaust systems.

In this specification unless the contrary is expressly stated, where a document, act or item of knowledge is referred to or discussed, this reference or discussion is not to be construed as an admission that the document, act or item of knowledge or any combination thereof was at the priority date, publicly available, known to the public, part of common general knowledge; or known to be relevant to an attempt to solve any problem with which this specification is concerned.

Excess exhaust backpressure is detrimental to the performance of internal combustion engines. Reducing restrictions to the flow of the combustion by-products (exhaust) from the combustion chamber of an internal combustion engine yields considerable improvements in the torque and power outputs, and the fuel, volumetric and thermal efficiencies of the engine.

The removal of the exhaust gases from the combustion chamber using the momentum of the exhaust gases in a long exhaust pipe, or by taking advantage of the pressure waves set up in the exhaust pipe by the discharge of the previously expelled gases, is known as scavenging.

Balance pipes even out exhaust pulse variation in a pair of exhaust pipes, where these pulse variations are created by the firing order of an engine. Balance pipes are particularly useful in the exhaust systems of vehicles with engines that create a great deal of variation in exhaust pulse, such as V8 engines for instance.

Generally balance pipes are useful as they reduce exhaust noise, and improve scavenging at low engine speeds (empirical evidence suggests that they provide reduced advantage at higher engine speeds).

A problem with balance pipes however is the slowing or reversal of exhaust flow due to the interference or indeed collision of exhaust pulses therein.

It is an object of the present invention therefore to substantially ameliorate the aforementioned difficulty, or at least provide the public with a useful alternative to known exhausts and balance pipes.

Other objects and advantages of the present invention will become apparent from the following description, taken in connection with the accompanying drawings, wherein, by way of illustration and example, an embodiment of the present invention is disclosed.

For the purpose of this specification the word "comprising" means "including but not limited to", and the word 'comprises' has a corresponding meaning.

DISCLOSURE OF THE INVENTION

In one form of this invention, there is proposed a balance pipe assembly for a vehicle exhaust system comprising at least a pair of exhaust pipes or pipe shaped portions, a further pipe or pipe shaped portion extending between the exhaust pipes or pipe shaped portions so as to act as a balance pipe, at least one of the exhaust pipes or pipe shaped portions comprising means adapted to reduce the pressure of exhaust gasses passing there through at a position downstream of the balance pipe or pipe shaped portion.

Preferably, each of the exhaust pipes or pipe shaped portions comprises means adapted to reduce the pressure of exhaust gasses passing there through at a position downstream of the balance pipe or pipe shaped portion.

Preferably, the or each means adapted to reduce the pressure of exhaust gasses passing there through further comprises a pipe or pipe shaped portion having a locally reduced internal diameter, so as to thereby form a venturi creating a venturi effect.

Preferably, the assembly further comprises a pipe or pipe shaped portion that is adapted to promote the swirling of exhaust gases passing there through.

Preferably, each of the exhaust pipes or pipe shaped portions comprises a portion that is adapted to promote the swirling of exhaust gases passing there through.

Preferably, the pipe or pipe shaped portion that is adapted to promote swirling of exhaust gas passing there through is located at a position downstream of the venturi.

Preferably, the or each pipe or pipe shaped portion that is adapted to promote swirling commences at or near the venturi and progressively opens up in a downstream direction until the pipe or pipe shaped portion once again has substantially the same diameter downstream of the venturi as it did upstream of it.

Preferably, the or each portion that is adapted to promote the swirling of exhaust gas passing there through comprises a swirled groove formed into the wall thereof.

Preferably, each exhaust pipe or pipe shaped portion comprises an inlet adapted to connect with an end of a pipe from an upstream direction in the vehicle exhaust system, and an outlet adapted to connect with an end of a pipe extending in a downstream direction in the vehicle exhaust system.

In a further form, the invention may be said to reside in a vehicle exhaust installation comprising a balance pipe assembly as described above.

In a further form, the invention may be said to reside in a method of manufacturing a balance pipe assembly as described above, the method including the steps of forming a pair of identical parts and then joining these along substantially matching edges.

Preferably, the methods is further characterised in that each of the parts is pressed from a sheet or blank of metal or aluminium, and then welded along the matching edges.

BRIEF DESCRIPTION OF THE DRAWINGS

For a better understanding of this invention it will now be described with respect to a preferred embodiment which shall be described herein with the assistance of drawings wherein.

DETAILED DESCRIPTION OF THE INVENTION

Figure 1:
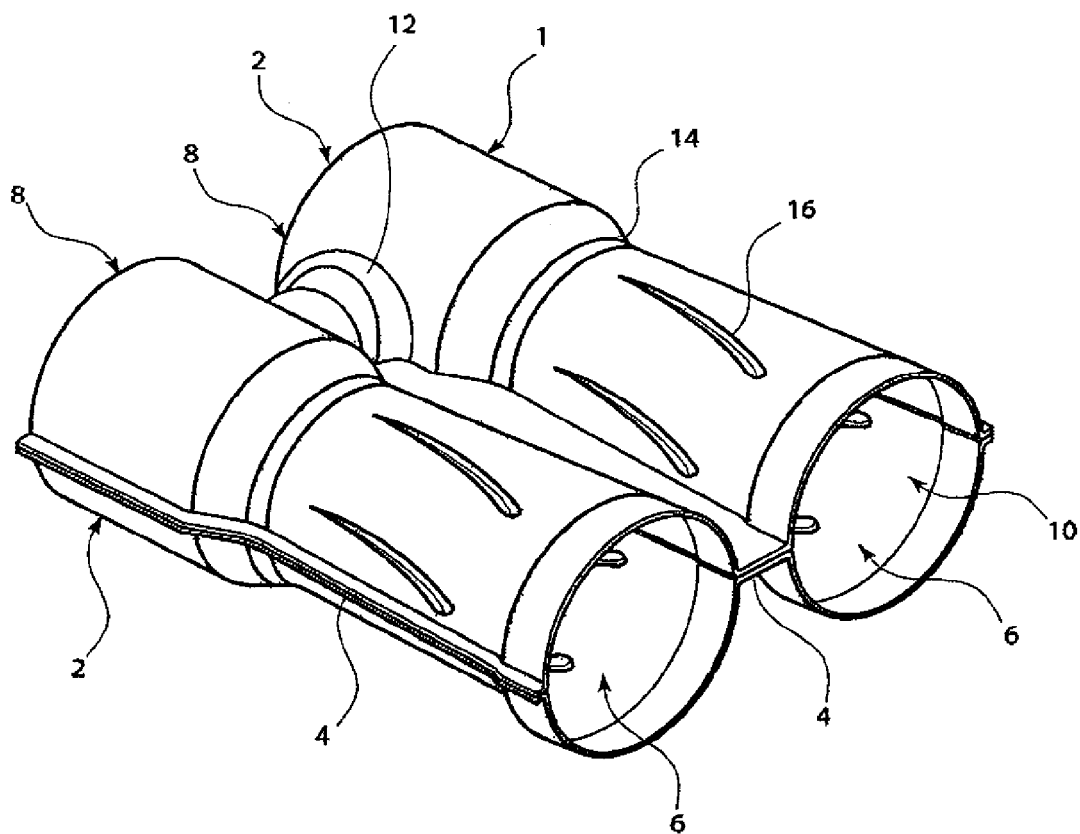
FIG. 1 is a perspective view of a balance pipe assembly.
Figure 2:
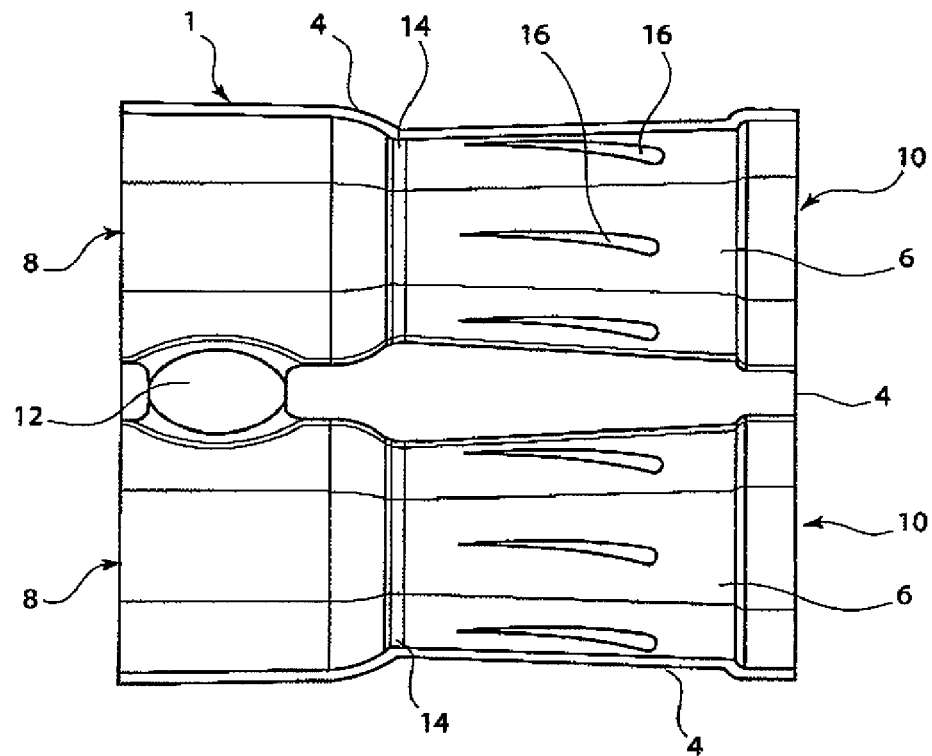
FIG. 2 is a top view of the assembly in FIG. 1.

Referring now to the illustrations, and in particular to FIG. 1, where there is illustrated a balance pipe assembly 1 for a dual exhaust system such as that which would be utilised on an engine having two banks of cylinders, such as a V6 or V8 engine.

Figure 3:
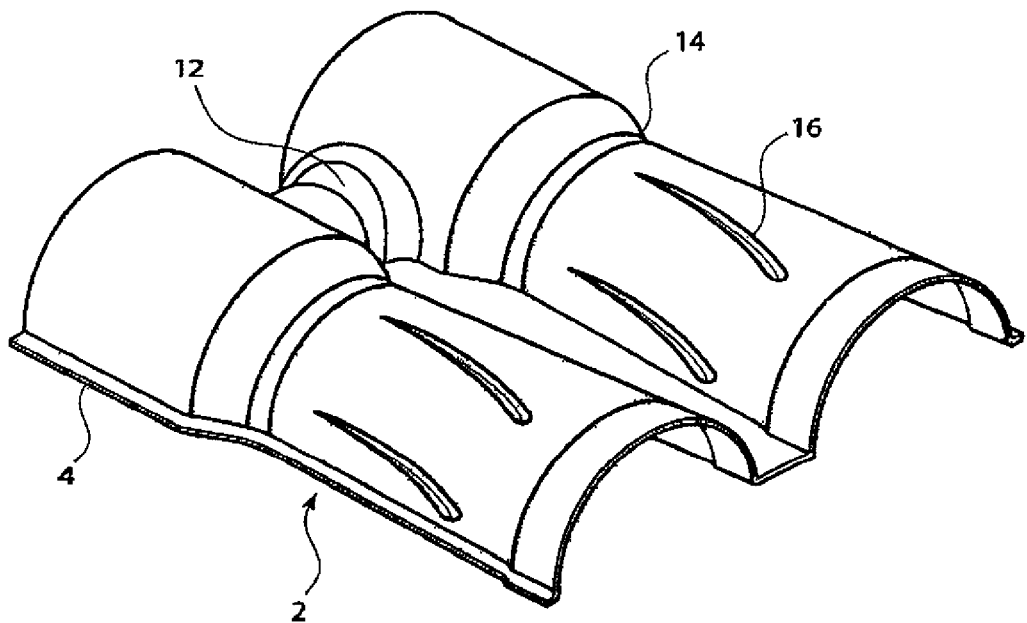
FIG. 3 is a perspective view of half of the balance pipe assembly in FIG. 1.

Referring now to FIG. 3, the balance pipe assembly is formed from a pair of identical parts 2, each of which may be pressed from a piece or blank of sheet metal or aluminium, and then welded together along matching edges 4.

It would be understood by a person skilled in the relevant art however, that such a balance pipe assembly could be fabricated from lengths of pipe that are welded together so as to have this arrangement, although a drawback of such a fabrication is that it would be laborious to produce.

Referring back to FIG. 1, the balance pipe assembly defines a pair of pipes 6 that run parallel to one another, each of which is intended to be positioned in line with one of the pair of exhaust pipes of a vehicle exhaust system at a point approximately midway between the engine exhaust manifolds and the exhaust outlets, so as to provide an exhaust gas passageway for the exhaust gasses to pass there through.

The assembly includes a pair of adjacent inlets 8 adapted to accept the end of a piece of exhaust pipe that extends from the engine exhaust manifold or catalytic converter as the case may be. The balance pipe assembly also includes a pair of adjacent outlets 10 that are adapted to accept the end of a piece of exhaust pipe that extends to the mufflers, and ultimately the exhaust outlet.

These pipes are connected by a balance pipe 12 that runs between them, and both of the pipes 6 includes means to create a source of reduced pressure at a position downstream of the balance pipe 12.

This means to create a source of reduced pressure comprises a locally reduced internal diameter. There is also a portion that is adapted to promote the swirling of exhaust gas passing there through.

That is, at point downstream of the balance pipe, each of the pipes tapers down so as to reduce the internal diameter from that at the inlet 8, thereby forming a venturi 14. Each pipe then gradually opens out again to the full diameter at the outlet 10.

There are a series of gradually swirled grooves 16 formed into the wall of each pipe 6 in the region where it opens out gradually, these gradually swirled grooves project inwardly of the wall of the pipe 6.

In use, the exhaust gasses from the engine speed up as they pass through the venturi (the restriction created by the reduced diameter 14), this reduces the pressure in the pipe, creating a partial vacuum, as per the Bernoulli affect.

Upon leaving the venturi, the exhaust gasses are swirled into a vortex by the swirled grooves 16, this too creates a suction that augments the suction created by the venturi 14.

The practical effect created by this suction is that it assists to draw exhaust gas through and past the balance pipe 12, thereby preventing reversion of the exhaust gases in the balance pipe. More generally, it also speeds up exhaust flow at a point approximately midway in the exhaust system (i.e. similar to a scavenging effect), improving overall exhaust flow in the exhaust system.

It is considered therefore that the balance pipe assembly such as that described herein would prove to be of considerable benefit to those seeking an exhaust system that will improve the torque and power outputs, and the fuel, volumetric and thermal efficiency of their car engine.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The claims defining the invention are as follows:

1. A balance pipe assembly for a vehicle exhaust system comprising
   at least a pair of exhaust pipes or pipe shaped portions,
   a further pipe or pipe shaped portion extending between the exhaust pipes or pipe shaped portions so as to act as a balance pipe, at least one of the exhaust pipes or pipe shaped portions comprising means adapted to reduce the pressure of exhaust gasses passing there through at a position downstream of the balance pipe or pipe shaped portion, and
   a pipe or pipe shaped portion that is adapted to promote the swirling of exhaust gases passing there through,
   wherein each of the exhaust pipes or pipe shaped portions comprises a portion that is adapted to promote the swirling of exhaust gases passing there through,
   wherein the pipe or pipe shaped portion that is adapted to promote swirling of exhaust gas passing there through is located at a position downstream of the venture,
   wherein the or each pipe or pipe shaped portion that is adapted to promote swirling commences at or near the venturi and progressively opens up in a downstream direction until the pipe or pipe shaped portion once again has substantially the same diameter downstream of the venturi as it did upstream of it, and
   wherein the or each portion that is adapted to promote the swirling of exhaust gas passing there through comprises a swirled groove formed into the wall thereof.

2. The balance pipe assembly of claim 1, further characterised in that each of the exhaust pipes or pipe shaped portions comprises means adapted to reduce the pressure of exhaust gasses passing there through at a position downstream of the balance pipe or pipe shaped portion.

3. The balance pipe assembly of claim 1, further characterised in that the or each means adapted to reduce the pressure of exhaust gasses passing there through further comprises a pipe or pipe shaped portion having a locally reduced internal diameter, so as to thereby form a venturi creating a venturi effect.

4. The balance pipe assembly of claim 1, further characterised in that each exhaust pipe or pipe shaped portion comprises an inlet adapted to connect with an end of a pipe from an upstream direction in the vehicle exhaust system, and an outlet adapted to connect with an end of a pipe extending in a downstream direction in the vehicle exhaust system.

5. A vehicle exhaust installation comprising a balance pipe assembly as defined in claim 1.

* * * * *